(12) United States Patent
Feyereisen et al.

(10) Patent No.: US 7,852,236 B2
(45) Date of Patent: Dec. 14, 2010

(54) AIRCRAFT SYNTHETIC VISION SYSTEM FOR APPROACH AND LANDING

(75) Inventors: Thea L. Feyereisen, Hudson, WI (US); Ivan Sandy Wyatt, Scottsdale, AZ (US); Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 364 days.

(21) Appl. No.: 12/183,693

(22) Filed: Jul. 31, 2008

(65) Prior Publication Data
US 2010/0026525 A1  Feb. 4, 2010

(51) Int. Cl.
G01C 21/00 (2006.01)
G01C 23/00 (2006.01)

(52) U.S. Cl. .................. 340/971; 340/951; 340/945; 701/1; 701/16

(58) Field of Classification Search .......... 340/972, 340/951, 971, 945, 973, 980; 701/1, 14, 701/16, 18; 73/178 T; 244/183
See application file for complete search history.

(56) References Cited

U.S. PATENT DOCUMENTS

| | | | |
|---|---|---|---|
| 3,978,730 A * | 9/1976 | Anderson | 73/387 |
| 6,021,374 A * | 2/2000 | Wood | 701/301 |
| 6,157,876 A * | 12/2000 | Tarleton et al. | 701/16 |
| 6,591,171 B1 * | 7/2003 | Ammar et al. | 340/968 |
| 7,209,053 B2 | 4/2007 | Gannon | |
| 7,212,216 B2 | 5/2007 | He et al. | |
| 7,218,245 B2 | 5/2007 | Wyatt et al. | |
| 7,283,064 B2 | 10/2007 | He | |
| 2001/0047230 A1 * | 11/2001 | Gremmert et al. | 340/970 |
| 2002/0040263 A1 | 4/2002 | Johnson et al. | |
| 2002/0099528 A1 | 7/2002 | Hett | |
| 2003/0169185 A1 * | 9/2003 | Taylor | 340/945 |
| 2003/0171856 A1 | 9/2003 | Wilf | |
| 2004/0044446 A1 | 3/2004 | Staggs | |
| 2006/0247828 A1 | 11/2006 | Ardila et al. | |

(Continued)

FOREIGN PATENT DOCUMENTS

EP    1462767 A1    9/2004

(Continued)

OTHER PUBLICATIONS

EP Search Report dated Nov. 23, 2009, EP 09166413.6-1236.

*Primary Examiner*—Eric M Blount
(74) *Attorney, Agent, or Firm*—Ingrassia Fisher & Lorenz, P.C.

(57) ABSTRACT

An aircraft synthetic vision system (100) is provided for increasing data input to a pilot (109) during approach and landing flight operations, and includes a runway assistance landing system (114) and a plurality of databases (106, 108, 110, 112) which may include, for example, a terrain database (106), an obstacle database (112); and a validated runway database (110). The processor (104) detects the likelihood of an error in determining the altitude from at least one of the runway assistance landing system (114), the plurality of databases (106, 108, 110, 112), and identifies the error. The processor (104) further determines augmented coordinates, and a processor (104) generates symbology commands to a first display (116) for displaying a runway environment in response to data provided to the processor (104) from each of the runway assistance landing system (114), the plurality of databases (106, 108, 110, 112), and the processor (104).

20 Claims, 3 Drawing Sheets

U.S. PATENT DOCUMENTS

| | | |
|---|---|---|
| 2007/0005199 A1 | 1/2007 | He |
| 2007/0027583 A1* | 2/2007 | Tamir et al. .................... 701/1 |
| 2007/0088491 A1 | 4/2007 | He |
| 2007/0106433 A1 | 5/2007 | He |
| 2007/0188350 A1 | 8/2007 | He et al. |
| 2008/0056611 A1 | 3/2008 | Mathan et al. |

FOREIGN PATENT DOCUMENTS

| | | |
|---|---|---|
| EP | 1843127 A2 | 10/2007 |
| WO | 0057202 | 9/2000 |

* cited by examiner

AIRCRAFT SYNTHETIC VISION SYSTEM FOR APPROACH AND LANDING

FIELD OF THE INVENTION

The present invention generally relates to a system for increasing aircraft safety and more particularly to a system for increasing data input to a pilot during approach and landing.

BACKGROUND OF THE INVENTION

The approach to landing and touch down on the runway of an aircraft is probably the most challenging task a pilot undertakes during normal operation. To perform the landing properly, the aircraft approaches the runway within an envelope of attitude, course, speed, and rate of descent limits. The course limits include, for example, both lateral limits and glide slope limits. An approach outside of this envelope can result in an undesirable positioning of the aircraft with respect to the runway, resulting in possibly discontinuance of the landing attempt.

In some instances visibility may be poor during approach and landing operations, resulting in what is known as instrument flight conditions. During instrument flight conditions, pilots rely on instruments, rather than visual references, to navigate the aircraft. Even during good weather conditions, pilots typically rely on instruments to some extent during the approach. Many airports and aircraft include runway assistance landing systems, for example an Instrument Landing System (ILS) to help guide aircraft during approach and landing operations. These systems allow for the display of a lateral deviation indicator to indicate aircraft lateral deviation from the approach course, and the display of a glide slope indicator to indicate vertical deviation from the glide slope.

Because of poor ground infrastructure, there are limits to how low a pilot may descend on approach prior to making visual contact with the runway environment for runways having an instrument approach procedure. Typical low visibility approaches require a combination of avionics equipage, surface infrastructure, and specific crew training. These requirements limit low visibility approaches to a small number of runways. For example, typical decision heights above ground (whether to land or not) for a Non-Directional beacon (NDB) approach is 700 feet above ground, while a VHF Omnidirectional radio Range (VOR) approach is 500 feet, a Global Positioning System (GPS) approach is 300 feet, Local Area Augmentation System (LAAS) is 250 feet, and an ILS approach is 200 feet. A sensor imaging system may allow a descent below these altitude-above-ground figures, for example, 100 feet lower on an ILS approach, because the pilot is performing as a sensor, thereby validating position integrity by seeing the runway environment. However, airports having an imaging system combined with aircraft having a heads up display are a small percentage of operating aircraft and a small percentage of runways with the ILS and right airport infrastructure (lighting and monitoring of signal).

However, it is desired to improve operational performance and lower the cost of operations, while increasing the availability of low visual operations to a larger number of runways.

Accordingly, it is desirable to provide a system and method for improving the ability to fly low altitude, low visibility approaches to a larger number of airports. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An aircraft synthetic vision system is provided for increasing data input to a pilot during approach and landing flight operations, and includes a runway assistance landing system and a plurality of databases which may include, for example, a terrain database, an obstacle database; and a validated runway database. A first apparatus detects the likelihood of an error in determining the altitude from at least one of the runway assistance landing system, the plurality of databases, and the first apparatus, and identifies the error. A second apparatus determines augmented coordinates, and a processor generates symbology commands to a first display for displaying a runway environment in response to data provided to the processor from each of the runway assistance landing system, the plurality of databases, and the first and second apparatus.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A system and method is disclosed that will allow pilots to descend to a low altitude, e.g., to 100 feet or below, using ground based ILS, a combination of databases, advanced symbology, altimetry error detection, and high precision augmented coordinates. The databases include a terrain database, an obstacle database, and a validated runway database rendered on a primary flight display. This system eliminates the need for a sensor imaging system. The IPFD runway and extended runway centerline is utilized in lieu of pilot visual detection of external visual reference of the landing environment obtained from sensor imagery projected on a display (typically a heads up display).

Although the examples of embodiments in this specification are described in terms of the currently widely used ILS, embodiments of the present invention are not limited to applications of airports utilizing ILS. To the contrary, embodiments of the present invention are applicable to any runway utilizing a runway assistance landing system (of which ILS is an example) that transmits a signal to aircraft indicating an approach line to a runway. Alternate embodiments of the present invention to those described below may utilize whatever runway assistance landing system signals are available, for example a ground based navigational system, a GPS navigation aid, a flight management system, and an inertial navigation system, to dynamically calibrate and determine a precise approach course to a runway and display the approach course relative to the runway centerline direction to pilots.

Figure 1:
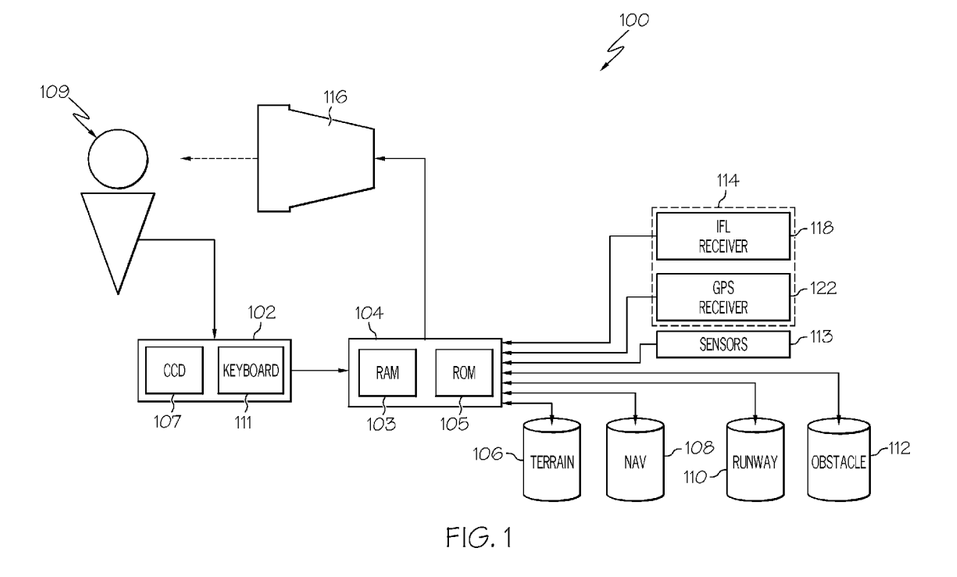
FIG. 1 is a functional block diagram of a flight display system according to an exemplary embodiment.

Referring to FIG. 1, an exemplary flight deck display system is depicted and will be described. The system 100 includes a user interface 102, a processor 104, one or more terrain databases 106 sometimes referred to as a Terrain Avoidance and Warning System (TAWS), one or more navigation databases 108, one or more runway databases 110 sometimes referred to as a Terrain Avoidance and Warning system (TAWS), one or more obstacle databases 112 sometimes referred to as a Traffic and Collision Avoidance System (TCAS), various sensors 113, various external data sources 114, and a display device 116. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

No matter how the processor 104 is specifically implemented, it is in operable communication with the terrain databases 106, the navigation databases 108, and the display device 116, and is coupled to receive various types of inertial data from the various sensors 113, and various other avionics-related data from the external data sources 114. The processor 104 is configured, in response to the inertial data and the avionics-related data, to selectively retrieve terrain data from one or more of the terrain databases 106 and navigation data from one or more of the navigation databases 108, and to supply appropriate display commands to the display device 116. The display device 116, in response to the display commands, selectively renders various types of textual, graphic, and/or iconic information. The preferred manner in which the textual, graphic, and/or iconic information are rendered by the display device 116 will be described in more detail further below. Before doing so, however, a brief description of the databases 106, 108, the sensors 113, and the external data sources 114, at least in the depicted embodiment, will be provided.

The terrain databases 106 include various types of data representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106, the navigation databases 108, the runway databases 110, and the obstacle databases 112 are, for clarity and convenience, shown as being stored separate from the processor 104, all or portions of either or both of these databases 106, 108, 110, 112 could be loaded into the RAM 103, or integrally formed as part of the processor 104, and/or RAM 103, and/or ROM 105. The databases 106, 108, 110, 112 could also be part of a device or system that is physically separate from the system 100.

The sensors 113 may be implemented using various types of inertial sensors, systems, and or subsystems, now known or developed in the future, for supplying various types of inertial data. The inertial data may also vary, but preferably include data representative of the state of the aircraft such as, for example, aircraft speed, heading, altitude, and attitude. The number and type of external data sources 114 may also vary. For example, the external systems (or subsystems) may include, for example, a flight director and a navigation computer, just to name a couple. However, for ease of description and illustration, only an instrument landing system (ILS) receiver 118 and a global position system (GPS) receiver 122 are depicted in FIG. 1.

As is generally known, the ILS is a radio navigation system that provides aircraft with horizontal (or localizer) and vertical (or glide slope) guidance just before and during landing and, at certain fixed points, indicates the distance to the reference point of landing on a particular runway. The system includes ground-based transmitters (not illustrated) that transmit radio frequency signals. The ILS receiver 118 receives these signals and, using known techniques, determines the glide slope deviation of the aircraft. As is generally known, the glide slope deviation represents the difference between the desired aircraft glide slope for the particular runway and the actual aircraft glide slope. The ILS receiver 118 in turn supplies data representative of the determined glide slope deviation to the processor 104.

The GPS receiver 122 is a multi-channel receiver, with each channel tuned to receive one or more of the GPS broadcast signals transmitted by the constellation of GPS satellites (not illustrated) orbiting the earth. Each GPS satellite encircles the earth two times each day, and the orbits are arranged so that at least four satellites are always within line of sight from almost anywhere on the earth. The GPS receiver 122, upon receipt of the GPS broadcast signals from at least three, and preferably four, or more of the GPS satellites, determines the distance between the GPS receiver 122 and the GPS satellites and the position of the GPS satellites. Based on these determinations, the GPS receiver 122, using a technique known as trilateration, determines, for example, aircraft position, groundspeed, and ground track angle. These data may be supplied to the processor 104, which may determine aircraft glide slope deviation therefrom. Preferably, however, the GPS receiver 122 is configured to determine, and supply data representative of, aircraft glide slope deviation to the processor 104.

The display device 116, as noted above, in response to display commands supplied from the processor 104, selectively renders various textual, graphic, and/or iconic information, and thereby supply visual feedback to the user 109. It will be appreciated that the display device 116 may be implemented using any one of numerous known display devices suitable for rendering textual, graphic, and/or iconic information in a format viewable by the user 109. Non-limiting examples of such display devices include various cathode ray tube (CRT) displays, and various flat panel displays such as various types of LCD (liquid crystal display) and TFT (thin film transistor) displays. The display device 116 may additionally be implemented as a panel mounted display, a HUD (head-up display) projection, or any one of numerous known technologies. It is additionally noted that the display device 116 may be configured as any one of numerous types of aircraft flight deck displays. For example, it may be configured as a multi-function display, a horizontal situation indicator, or a vertical situation indicator, just to name a few. In the depicted embodiment, however, the display device 116 is configured as a primary flight display (PFD).

Figure 2:
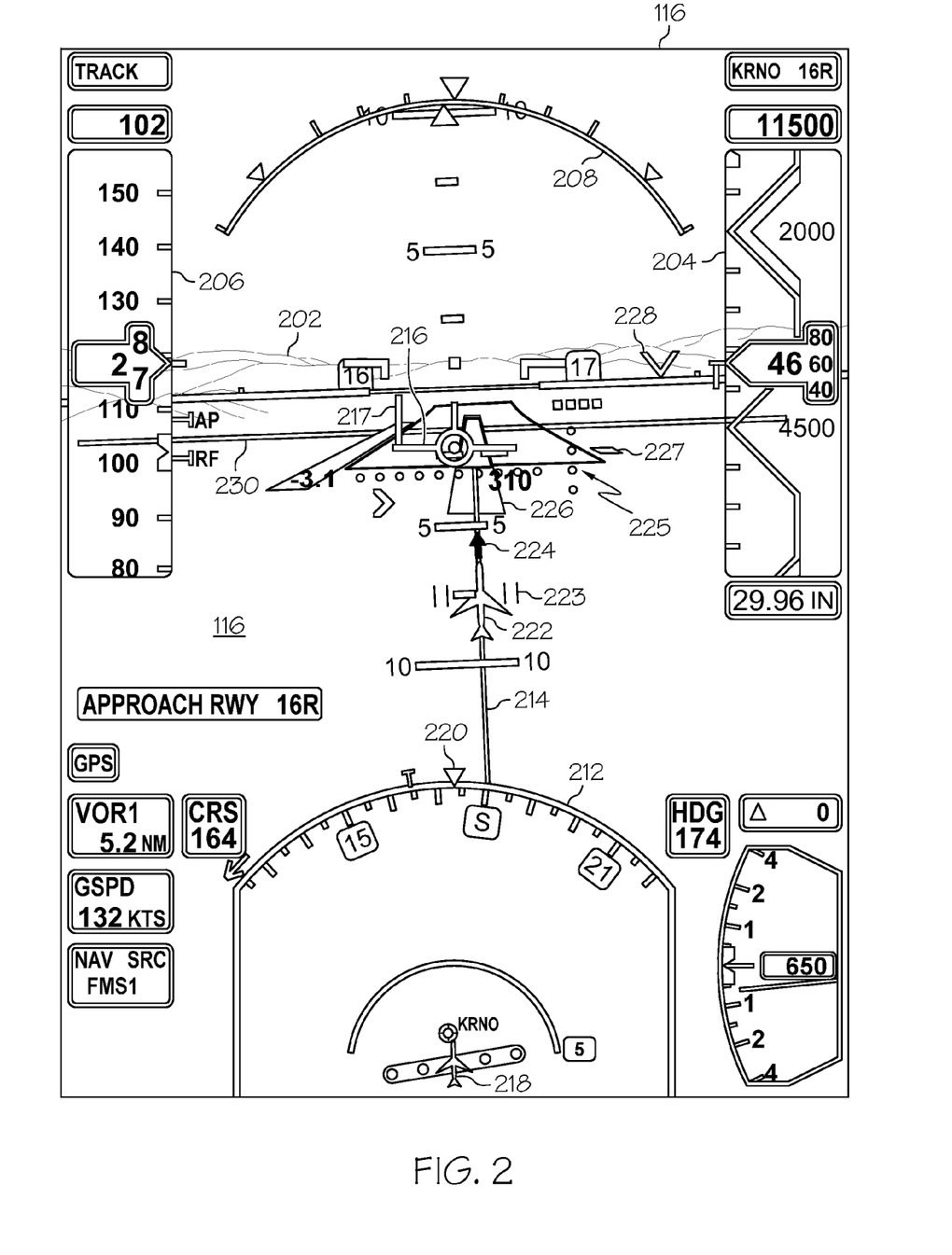
FIG. 2 is an exemplary image that may be rendered on the flight display system of FIG. 1.

Referring to FIG. 2, exemplary textual, graphical, and/or iconic information rendered by the display device 116, in response to appropriate display commands from the processor 104 is depicted. It is seen that the display device 116 renders a view of the terrain 202 ahead of the aircraft, preferably as a three-dimensional perspective view, an altitude indicator 204, an airspeed indicator 206, an attitude indicator 208, a compass 212, an extended runway centerline 214, and a flight path vector indicator 216. The heading indicator 212 includes an aircraft icon 218, and a heading marker 220 identifying the current heading (a heading of 174 degrees as shown). An additional current heading symbol 228 is disposed on the zero pitch reference line 230 to represent the current aircraft heading when the center of the forward looking display 116 is operating in a current track centered mode. The center of the forward looking display 116 represents where the aircraft is moving and the heading symbol 228 on the zero-pitch reference line 230 represent the current heading direction. The compass 212 can be shown either in heading up, or track up mode with airplane symbol 218 representing the present lateral position. Additional information (not shown) is typically provided in either graphic or numerical format representative, for example, of glide slope, altimeter setting, and navigation receiver frequencies.

An aircraft icon 222 is representative of the current heading direction, referenced to the current ground track 224, with the desired track as 214 for the specific runway 226 on which the aircraft is to land. The desired aircraft direction is determined, for example, by the processor 104 using data from the navigation database 108, the sensors 113, and the external data sources 114. It will be appreciated, however, that the desired aircraft direction may be determined by one or more other systems or subsystems, and from data or signals supplied from any one of numerous other systems or subsystems within, or external to, the aircraft. Regardless of the particular manner in which the desired aircraft direction is determined, the processor 104 supplies appropriate display commands to cause the display device 116 to render the aircraft icon 222 and ground track icon 224.

The embodiment described herein provides a method, without the need for a sensor imaging system, for descending to a low altitude above ground to facilate a landing with instruments including a combination of an instrument landing system (ILS), advanced symbology, altimetry error detection, high precision augmented coordinates, and a combination of databases including a terrain database, an obstacle database, and a validated runway database rendered on a primary flight display.

Instrument Landing System

ILS facilities provide an accurate and dependable means of navigating an aircraft to most runways for landing. An ILS transmits narrow horizontal beams which let flight crews know if their aircraft is left, right, or directly on course for a runway. The signal transmitted by the ILS consists of two vertical fan-shaped beam patterns that overlap at the center. Ideally, the beams are aligned with the extended centerline of the runway. The right side beam is typically referred to as the "blue" area while the left side of beam is the "yellow" area. An overlap between the two beams provides an on-track signal to aircraft. Ideally, at the point where ILS receivers on the aircraft receive blue area and yellow area beams signals of equal intensity, the aircraft is located precisely on the approach track of the runway centerline. Beams are also transmitted in a similar fashion to let the flight crews know if the aircraft is above, below, or directly on the proper glide slope for the runway.

Although the aviation embodiments in this specification are described in terms of the currently widely used ILS, embodiments of the present invention are not limited to applications of airports utilizing ILS. To the contrary, embodiments of the present invention are applicable to any navigation system (of which ILS is an example) that transmits a signal to aircraft indicating an approach line to a runway. Alternate embodiments of the present invention to those described below may utilize whatever navigation system signals are available, for example a ground based navigational system, a GPS navigation aid, a flight management system, and an inertial navigation system, to dynamically calibrate and determine a precise course.

Advanced Symbology

Advanced symbology is used to enhance simulated runway awareness by displaying runway alerts and guides on the graphical display 116 based on runway characteristics and current aircraft position and trajectory, and enable flight crews to maintain overall awareness during low visibility conditions but also enable flight crews who are unfamiliar with an airport to maintain overall awareness of their current position. This awareness is accomplished through an intuitive and easy to understand visual display 116. For example, the identification of targeted runways on final approach may be facilitated, a visual indication if the targeted runway is in a flight plan, and if the aircraft has clearance to use the targeted runway. Flight crews may be informed of runway distance remaining and display guides and warnings to aid flight crews in maintaining overall position awareness, thereby allowing the flight crews to better avoid dangerous runway intrusions while landing.

Advanced Symbology may be provided, for example, by use of the flight path marker 216, an acceleration cue 217, enhanced runway marking, and enhanced lateral and vertical deviation.

FLIGHT PATH MARKER. The flight path marker 216 is typically a circle with horizontal lines (representing wings) extending on both sides therefrom, a vertical line (representing a rudder) extending upwards therefrom, and indicates where the plane is "aimed". One known enhancement is, when the flight path marker 216 blocks the view of another symbol on the screen 116, the portion of the flight path marker 216 that is blocking the other symbol becomes transparent.

ACCELERATION CUE. The acceleration cue 217 is a marker, sometimes called a "carrot", on or near one of the horizontal lines of the flight path marker 216. The marker 217 typically moves vertically upward, or becomes longer, when the plane accelerates (or the wind increases), or vertically downward, or becomes shorter, when the plane decelerates.

ENHANCED RUNWAY MARKING. In some embodiments, runway guides 226 change colors and are accompanied by runway status warning messages when necessary to warn flight crews of potential dangerous conditions. A distance remaining marker 227 may be shown on the display 116, in a position ahead of the aircraft, to indicate the available runway length ahead, and the distance remaining marker 227 may change color if the distance remaining becomes critical. Runway identification, for example 32S, may appear on the displayed target runway 226. The target runway 226 may be highlighted, for example, by a different color, a brighter color, or thicker lines. The runway color may assume different colors depending on its status, for example, red when in use by another.

ENHANCED LATERAL AND VERTICAL DEVIATION. Previously, the symbology used on the head-up display 116 to represent the information previously provided by the horizontal indicator was not intuitive. The pilot had to be trained to understand what data the symbology represented and how to interpret the data. By making the symbology more intuitive, aircraft navigation is simplified, pilot error and fatigue is reduced, and safety is increased.

Perspective conformal lateral deviation symbology provides intuitive displays to flight crews of current position in relation to an intended flight path. In particular, lateral deviation symbology 204 indicates to a flight crew the amount by which the aircraft has deviated to the left or right of an intended course. Lateral deviation marks 223 and vertical deviation marks 225 on perspective conformal deviation symbology represent a fixed ground distance from the intended flight path. As the aircraft pitches, ascends or descends, the display distance between the deviation marks 223, 225 will vary. However, the actual ground distance from the intended flight path represented by the deviation marks 223, 225 remains the same. Therefore, flight crews can determine position information with reduced workload by merely observing the position of the aircraft in relation to the deviation marks 223, 225. Regardless of attitude or altitude, flight crews know how far off course an aircraft is if the aircraft is a given number of deviation marks 223, 225 from the intended flight path.

The lateral deviation marks 223 are lateral deviation indicators used to provide additional visual cues for determining terrain and deviation line closure rate. The lateral deviation marks 223 are used to represent both present deviations from the centerline of the runway 226 and direction of aircraft movement. Thus, the lateral deviation marks 223 provide a visual guide for closure rate to the centerline allowing the pilot to more easily align the aircraft with the runway 226. The processor 104 generates the lateral deviation marks 223 based on current aircraft parameters obtained from the navigation system 108 and/or other avionic systems. The lateral deviation marks 223 may be generated by computing terrain-tracing projection lines at a number of fixed angles matching an emission beam pattern of the runway ILS beacon. Sections of the terrain-tracing lines in the forward looking perspective display view may be used to generate the lateral deviation marks 223.

Terrain augmented conformal lateral and vertical deviation display symbology improves a pilot's spatial awareness during aircraft approach and landing. The pilot may be able to quickly interpret the symbology and take actions based on the elevation of the surrounding terrain. As a result, aircraft navigation may be simplified, pilot error and fatigue may be reduced, and safety may be increased.

Altimetry Error Detection

When a ground based agency provides the current altimeter setting, the pilot manually enters the setting on the altimeter. This procedure may lead to the improper setting being set on the altimeter. Other available information, such as from the GPS and terrain databases 106, 122, may provide an "expected altitude" that is compared with the altitude provided by the altimeter. When the expected altitude varies beyond a threshold, a warning is provided to the aircrew to check the altimeter setting. The processor optionally may prevent any conflicting data from being used to provide the altimeter setting.

High Precision Augmented Coordinates

A variety of sources may be accessed to verify the coordinates provided by a primary source. For example, it the GPS is providing the primary coordinates, a ground based signal or a differentiated GPS signal may be accessed to confirm the GPS coordinates. In addition, inertial sensors may be used to smooth the output of augmented coordinate or to provide short term coasting when primary position data source is interrupted.

Terrain Database

Most modern displays additionally allow a vehicle flight plan to be displayed from different views, either a lateral view, a vertical view, or perspective views which can be displayed individually or simultaneously on the same display. The lateral view, generally known as a lateral map display, is basically a top-view of the aircraft flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate where the aircraft may potentially impact terrain.

The perspective view provides a three-dimensional view of the vehicle flight plan. The perspective view display, as shown by the display 116, may include one or more of the above-mentioned features that are displayed on the lateral map, including the terrain information.

In one exemplary embodiment, the processor 104 is adapted to receive terrain data from the terrain database 106 and navigation data from the navigation database 108, operable, in response thereto, to supply one or more image rendering display commands. The display device 116 is coupled to receive the image rendering display commands and is operable, in response thereto, to simultaneously render (i) a perspective view image representative of the terrain data and navigation data and (ii) one or more terrain-tracing lines. The perspective view image includes terrain having a profile determined by elevations of the terrain. Each terrain-tracing line (i) extends at least partially across the terrain, (ii) represents at least one of a ground-referenced range to a fixed location on the terrain and a vehicle-referenced range from the vehicle to a fixed range away from the vehicle, and (iii) conforms to the terrain profile. The processor is configured to selectively display at least one of the ground-referenced range and the vehicle-referenced range.

The terrain databases 106 include various types of data, including elevation data, representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraft approach information. It will be appreciated that, although the terrain databases 106 and the navigation databases 108 are, for clarity and convenience, shown as being stored separate from the processor 104, all or portions of either or both of these databases 106, 108 could be loaded into the on-board RAM 103, or integrally formed as part of the processor 104, and/or RAM 103, and/or ROM 105. The terrain databases 106 and navigation databases 108 could also be part of a device or system that is physically separate from the display system 100.

The terrain database 106 supplies data representative of the location of terrain that may be a threat to the aircraft. The processor 104, in response to the obstacle data, preferably supplies appropriate display commands to the display device 116.

A number of aspects of the display 116 (which are controlled by the processor 104 in a practical embodiment) contribute to the improved contents and appearance of the heads-down display to increase the situational and navigational awareness of the pilot and/or flight crew. Image generation and display aspects of the display 116 leverage known techniques such that existing avionics displays can be modified in a straightforward manner to support the different features described herein. In a practical implementation, the concepts described herein are realized in the form of, for example, revised display generation software or processing resident at the processor 104.

One approach used to enhance terrain imagery in existing multi-functional aircraft displays is to combine high resolution, computer-generated terrain image data derived from onboard databases (e.g., synthetic vision systems) with enhanced, real-time terrain image data derived from onboard vision sensor systems (e.g., Forward Looking Infrared/FLIR sensors, active and passive radar devices, etc.). For example, in today's aircraft displays, high resolution terrain data has to be provided on a continuous basis to an onboard graphics display processor, in order for the processor to produce steady, three-dimensional perspective view images of the terrain for critical flight applications.

For simplicity of discussion, the term "terrain" is referenced hereinafter to include earth referenced subjects including, but not limited to, ground and structures located on the ground, airports, airfields, and the like.

Notably, the visibility of the terrain information displayed on the screen of visual display 116 may be enhanced responsive to one or more suitable algorithms (e.g., implemented in software) executed by the processor 104, which functions to determine an aircraft's current position, heading and speed, and initially loads a patch of terrain data for a region that is suitably sized to provide a rapid initialization of the data, the data correction, and also sized for a reasonable amount of flight time. The processor 104 monitors the aircraft's position, heading, and speed (e.g., also attitude when pertinent), and continuously predicts the potential boundaries of a three-dimensional region (volume) of terrain in the flight path based on the aircraft's then-current position, heading and speed (e.g., and attitude when pertinent). The processor 104 compares the predicted boundaries with the boundaries of the initially loaded terrain data, and if the distance from the aircraft to a predicted boundary is determined to be less than a predetermined value (e.g., distance value associated with the boundaries of the initially loaded data), then the processor 104 initiates an operation to load a new patch of terrain data that is optimally sized given the aircraft's current position, heading and speed (e.g., and attitude when pertinent). Notably, for this example embodiment, the processor 104 can execute the data loading operations separately from the operations that determine the aircraft's current position, heading and speed, in order to maintain a constant refresh rate and not interfere with the continuity of the current display of terrain.

Therefore, a system and method are provided for enhancing the visibility and ensuring the correctness of terrain information on an electronics aircraft display, in which high resolution terrain data for limited priority regions can be augmented and/or corrected with high accuracy terrain data (e.g., spatial position data, precision spatial position data, etc.) for the same priority regions, and the flight crew can be alerted to any discrepancy found between the high resolution terrain data and high accuracy spatial position data. For example, if the elevation of terrain data stored in an onboard database for a particular airport is slightly higher than the elevation of the terrain data for that airport derived from a navigation system, then that airport information can be obscured on a conventional display. However, the described system can augment and/or correct the terrain data from the database 106 with the more accurate spatial position data from the navigation system, which enhances the visibility and ensures the correctness of the terrain data for priority regions (e.g., near airports, runways, etc.) on the display. Nevertheless, if the terrain data about a known accurate data point is incorrect, then that incorrect data can be amplified by the augmentation/correction process. Therefore, if the value of the augmentation or correction of the terrain data is significantly greater than a predetermined or threshold value, then a visual and/or audio alert message regarding such a terrain data discrepancy can be issued for the flight crew. The flight crew can then decide whether or not to continue the approach based on direct visual navigation information derived from another source (e.g., onboard sensor, Flight Management System, navigation system, GPS receiver, etc.).

Obstacle Database

One important aspect of situational awareness is to be aware of obstacles which pose a threat to the craft. This is particularly true for aircraft during take-off and landing or other low altitude operations and even more so in low visibility conditions. Some displays depict information on obstacles in or near the craft's travel path. Obstacle data should be presented in such a way that it will provide timely awareness of the height, location, and distance of possible threats without distracting from the other primary information on the display. In order to successfully avoid the obstacles, the operator will have a short response time in which to determine how to best avoid obstacles. Therefore, it is advantageous to reduce the time and effort required by current obstacle displays for the operator to obtain the needed relational position information.

The processor 104 generates data for display on the display 116 based on the position of the aircraft and obstacle data. The processor 104 may be configured to receive and process navigation and positional data, for example, position, speed, direction) regarding current aircraft location from the navigation database 108. The navigation database 108 is configured to store data concerning one or more flight paths. Obstacles can be sought and displayed for different locations along one or more flight paths, thereby assisting an operator choose the safest path to follow.

The obstacle database 112 may contain data regarding obstacles, wherein the processor 104 sends a signal to the display 116 to render a simulated graphical representation of the obstacle based on that data, or the obstacle database may contain actual images of the obstacles, wherein the processor 104 sends a signal to display the actual image based on the positional data.

The processor 104 analyzes the data received from the obstacle database 112 and determines if the obstacles are within a selected distance from the aircraft. Obstacles that are not within a selected distance are not displayed. This procedure saves processor load and reduces display clutter by only displaying obstacles that are of interest to the aircraft. Size, speed, and altitude of the aircraft and size of the obstacle may be considered along with distance in determining whether to display the obstacle.

Validated Runway Database

A validated runway database 110 may store data related to, for example, runway lighting, identification numbers, position, and length, width, and hardness. As an aircraft approaches an airport, the processor 104 receives the aircraft's current position from, for example, the GPS receiver 122 and compares the current position data with the distance and/or usage limitation data stored in the database for the landing system being used by that airport.

As the aircraft approaches the airport, the data in the validated runway database 110 is compared with other data determined by other devices such as the sensors 113. If the data matches, a higher level of confidence is obtained.

Figure 3:
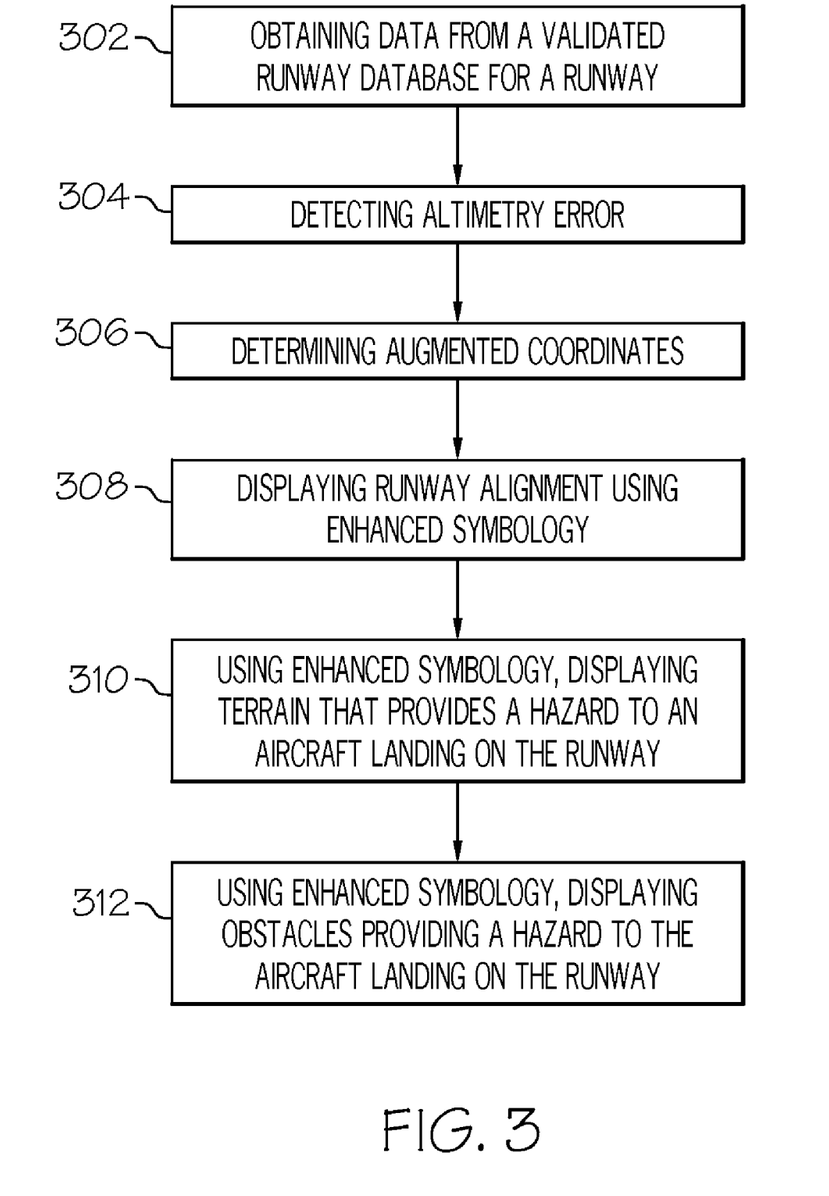
FIG. 3 is a flow chart of the steps illustrating an exemplary embodiment.

In summary, a system has disclosed that will allow pilots to descend to a low altitude, e.g., to 100 feet or below, using ground based ILS, a combination of databases, advanced symbology, altimetry error detection, and high precision augmented coordinates, thereby eliminating the need for a sensor imaging system. Referring to FIG. 3, the method includes the steps of obtaining 302 data from a validated runway, detecting 304 altimetry error, determining 306 augmented coordinates, using enhanced symbology to display 308, 310, 312 runway alignment, terrain, and obstacles.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An aircraft synthetic vision system for approach and landing, comprising:
    a runway assistance landing system;
    a plurality of databases containing data;
    a first apparatus determining augmented coordinates;
    a second apparatus detecting the likelihood of an error in determining the altitude from at least one of the runway assistance landing system, the plurality of databases, and the first apparatus, and identifying the error;
    a processor capable of generating symbology commands defining a runway environment in response to data provided to the processor from each of the runway assistance landing system, the plurality of databases, and the first and second apparatus; and
    a first display coupled to the processor for displaying the runway environment and aircraft approach status.

2. The aircraft synthetic vision system of claim 1 wherein the second apparatus displays the error to a pilot.

3. The aircraft synthetic vision system of claim 1 wherein the second apparatus prevents the data causing the error from being used to calculate the altitude.

4. The aircraft synthetic vision system of claim 1 wherein the first display provides at least one of a visual and an aural indication if the approach status is unsuitable for the displayed runway environment.

5. The aircraft synthetic vision system of claim 4 wherein the approach status is unsuitable when the augmented coordinates received by the runway assistance landing system are mismatched from the data within the plurality of databases.

6. The aircraft synthetic vision system of claim 4 further comprising a plurality of sensors, wherein the approach status is unsuitable when the augmented coordinates received by the runway assistance landing system are mismatched from the data within the plurality of sensors.

7. The aircraft synthetic vision system of claim 1 further comprising a second display that displays a recommended aircraft flight path including at least one of the variables selected from the group consisting of rate of descent and, airspeed.

8. An aircraft synthetic vision system for approach and landing, comprising:
    a runway assistance landing system;
    a plurality of databases including:
        a terrain database;
        an obstacle database; and
        a validated runway database.
    a first apparatus detecting the likelihood of an error in determining the altitude from at least one of the runway assistance landing system, the plurality of databases, and the first apparatus, and identifying the error;
    a second apparatus determining augmented coordinates;
    a first display; and
    a processor capable of generating symbology commands to the first display for displaying a runway environment in response to data provided to the processor from each of the runway assistance landing system, the plurality of databases, and the first and second apparatus.

9. The aircraft synthetic vision system of claim 8 wherein the first display displays the error to a pilot.

10. The aircraft synthetic vision system of claim 8 wherein the first apparatus prevents the data causing the error from being used to calculate the altitude.

11. The aircraft synthetic vision system of claim 8 wherein the first display provides a visual indication if the approach status is unsuitable for the displayed runway environment.

12. The aircraft synthetic vision system of claim 11 wherein the approach status is unsuitable when the augmented coordinates received by the runway assistance landing system are mismatched from the data within the plurality of databases.

13. The aircraft synthetic vision system of claim 8 further comprising a second display that displays a recommended aircraft flight path.

14. A method for displaying an aircraft synthetic runway environment in an aircraft, comprising:
    providing a validated runway database;
    determining the altitude of the aircraft;
    detecting the likelihood of an error in determining the altitude;
    determining augmented coordinates;

displaying a runway alignment on the primary flight display;

displaying an aircraft glide slope to the runway on a primary flight display;

displaying terrain providing a hazard to an aircraft approaching the runway on the primary flight display; and displaying obstacles providing a hazard to the aircraft approaching the runway, wherein each of the displaying steps comprises using enhanced symbology.

15. The method of claim 14 wherein the displaying steps include displaying a flight path marker, an acceleration cue, a runway marker.

16. The aircraft synthetic vision system of claim 14 further comprising displaying the error to a pilot.

17. The aircraft synthetic vision system of claim 14 wherein the detecting step includes collecting data and further comprising preventing any of the data causing an error from being used to calculate the altitude.

18. The aircraft synthetic vision system of claim 14 further comprising displaying a visual indication if the approach status is unsuitable for the displayed runway environment.

19. The aircraft synthetic vision system of claim 18 further comprising determining that the approach status is unsuitable when the augmented coordinates received by the runway assistance landing system are mismatched from the data within the plurality of databases.

20. The aircraft synthetic vision system of claim 18 further comprising determining that the approach is unsuitable when at least one of a) a runway is not confirmed in the correct position for a safe landing and b) the aircraft approach is not suitable considering 1) airspeed and altitude, and 2) at least one of lateral and vertical deviation.

* * * * *